No. 691,714. Patented Jan. 21, 1902.
F. S. CHURCH.
HAY LOADING APPARATUS.
(Application filed Apr. 19, 1901.)
(No Model.) 2 Sheets—Sheet 2.
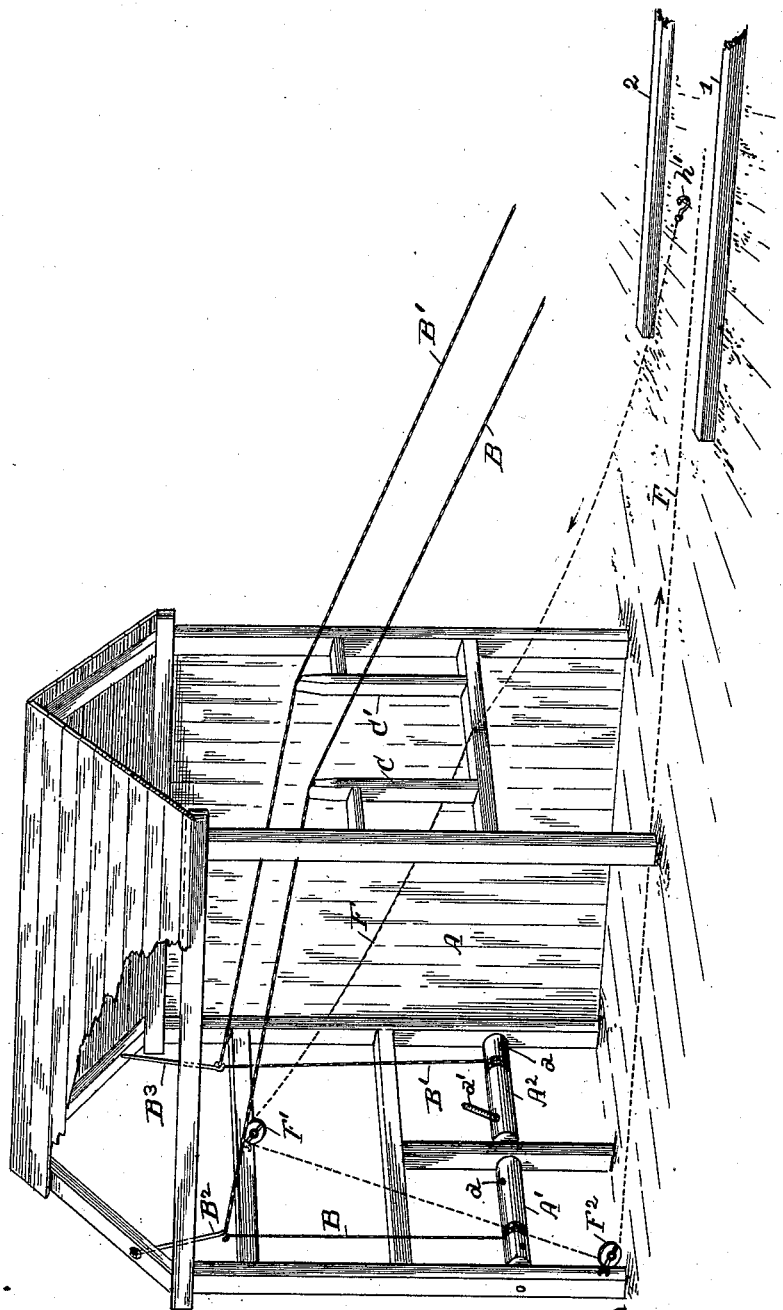

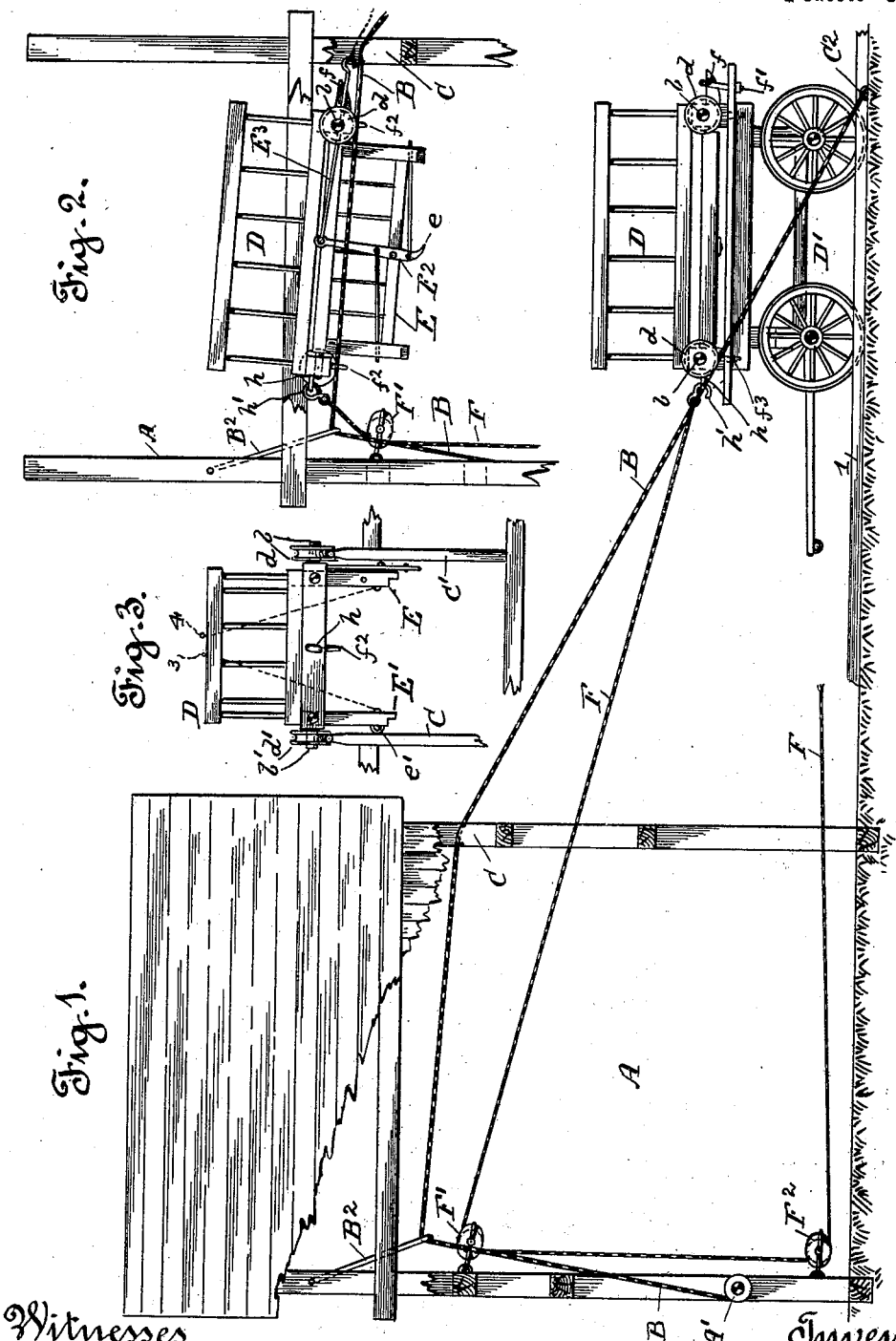

UNITED STATES PATENT OFFICE.

FRANK S. CHURCH, OF SIERRA VALLEY, CALIFORNIA, ASSIGNOR OF ONE-HALF TO LINUS DOLLEY, OF SIERRA VALLEY, CALIFORNIA.

HAY-LOADING APPARATUS.

SPECIFICATION forming part of Letters Patent No. 691,714, dated January 21, 1902.

Application filed April 19, 1901. Serial No. 56,552. (No model.)

*To all whom it may concern:*

Be it known that I, FRANK S. CHURCH, a citizen of the United States, residing at Sierra Valley, county of Sierra, State of California, have invented certain new and useful Improvements in Hay-Loading Apparatus; and I do hereby declare the following to be a full, clear, and exact description of the same.

The present invention has for its object the providing of mechanism whereby the entire load of hay as brought from the field may be elevated and deposited within the barn at a single operation, thus disposing with the labor at present required to put the hay into the barn. Ordinarily the loaded wagon drives up to or into the barn, and the hay is then removed from the wagon by pitchforks or other tools and suitably placed in the barn. By the hereinafter-described invention the entire wagon-body or hay-rack is removed from the wagon and elevated to the top of the barn and the load of hay released, after which the wagon body or rack is redeposited onto the wagon for return to the field for another load of hay.

In order to comprehend the invention, reference should be had to the accompanying sheet of drawings.

Figure 1 is a side view in elevation, illustrating the position of the wagon preparatory to its loaded rack being elevated into the barn. Fig. 2 is a similar view disclosing the position of the rack after being elevated into the barn and its bottom opened for release of the hay. Fig. 3 is an end view of the rack removed from the wagon; and Fig. 4 is a perspective view, partly in section, of the barn.

For the purpose of illustration of the invention the barn A is shown in skeleton. To one end of the barn, near the floor thereof, the drums or tension-rolls $A'$ $A^2$ are arranged. To drum or roll $A'$ is attached one end of the cable B and to drum or roll $A^2$ one end of cable $B'$. These cables extend upwardly and are run, respectively, through hangers $B^2$ $B^3$, secured to and depending from the roof-beams of the barn. The cables run from said hangers, preferably at a downward inclination, over grooved supports C $C'$ and thence outward beyond the barn, the free end of each being attached to a securing device $C^2$. The cables are thus run parallel in order to form an inclined trackway. The width of the trackway so formed is slightly greater than the width of the hay-rack D. In order to maintain the cables at an even tension, it is only required that the drums or rolls $A'$ $A^2$ be given a turn sufficient to draw the cable taut. For this purpose the rolls or drums are provided with sockets $a$, into which a hand-bar $a'$ fits. By means of the tension-rolls or drums undue sag to the suspension-tracks is compensated for.

The hay-wagon $D'$ is provided with a removable rack D. This rack is of such size as to hold a desirable quantity of hay—say one ton. To journals $b$ $b'$, projecting beyond the sides of the hay-rack, are loosely secured the grooved wheels or rolls $d$ $d'$, there being two grooved wheels for each side of the rack. The wheels $d$ $d'$ are a distance apart equal to the width of the suspension-trackway. From the rear end of the rack extends a lug $f$, which is designed to fit within the eyebolt $f'$, secured to and upwardly projecting from the body $D'$. By this means the rack is held centered to the body. In order to prevent the rack slipping from the body during transportation, the said rack is provided at each end with a depending pin or bolt $f^2$, which fits within openings or sockets $f^3$ at each end portion of the body. The bottom of the rack is a hinged one, being composed of hinged sections E $E'$. To section E is fulcrumed the lock-lever $E^2$, the hooked end $e$ of which engages with an eye $e'$, secured to section $E'$. The lock-lever E is operated from the rear end of the rack by means of the rod $E^3$, which rod is attached to the outer end of the lever and extends through the rear end piece of the rack. By simply drawing out or pushing in the rod $E^3$ the lever is moved out of and into locked engagement. Of course any other suitable style of releasing mechanism may be employed for the hinged sections.

To the forward end of the rack is attached the ring $h$, which receives the hook $h'$, secured to one end of the haulage-rope F. This rope extends into the barn and over sheave or pulley $F'$, secured to the barn at a height approximately equal to that of the trackway therein, and thence over sheave or pulley $F^2$, located near the floor of the barn. To the free end of the haulage-rope a horse is attached, or, if preferred, the free end may be secured to a suitable motor or hoisting-engine.

Presuming the trackway to have been erected and the other parts arranged as described, then the operation of loading the hay into the barn is as follows: The wagon with its loaded rack is driven from the field toward the barn. As it approaches the barn the wagon is run between the guide-rails 1 2, located outside of the barn, so as to place the front grooved wheels $d$ $d'$ of the rack in line with the cables B B'. The moment the forward wheels $d$ $d'$ are run upon the said cable the wagon is brought to a standstill, Fig. 1 of the drawings. The haulage-cable is then attached to rack, and the horse or motor, to which its free end is connected, set in motion. The pull or strain thus exerted upon the haulage-cable causes the rack to be lifted from the wagon and to be gradually drawn up the suspension-trackway toward the top of and into the barn. When the rack has been placed within the barn, pressure upon the haulage-cable ceases, and it may be held therein either by the tension of the haulage-cable or by any suitable form of lock mechanism. An operator then draws outward upon the rod $E^3$, so as to throw the fulcrumed lever $e$, in order to release or unlock the hinged sections constituting the bottom of the rack. When thus released, the weight of the hay within the rack will cause the hinged sections to open and permit the entire load of hay to fall from within the rack into the barn. The bottom is then closed by drawing upon the cords 3 4, so as to raise the hinged sections, which are then locked by forcing the draw-rod $E^3$ inward. By releasing the strain of the haulage-cable the rack will gradually move downward by gravity and be deposited upon the wagon, which is then driven out of the way or into the field for another load of hay and room thus made for a second loaded wagon to drive into position to be unloaded.

It will be understood that the unloading means herein described is in the nature of a temporary structure, which after the barn is loaded is to be removed or taken down until again required for use.

Having thus described the invention, what is claimed as new, and desired to be protected by Letters Patent, is—

1. The combination with the barn, of the cable-trackway comprising the oppositely-disposed cables B, B', running at an incline into the same near the top thereof, means for supporting the cables within the barn, and means at the rear of the barn for independently tensioning the cables, and of means whereby a loaded hay-rack is propelled up said inclined trackway and into the barn.

2. The combination with a barn, of a cable-trackway arranged within the top of the barn and extending therefrom to the ground at an inclination, devices whereby the tension of the trackway is regulated, a hay-rack, grooved wheels secured to the rack and which work over the trackway, the hinged-section bottom for the rack, devices for locking and releasing the hinged sections, and means whereby the loaded rack is propelled up the said inclined trackway and into the barn.

In witness whereof I have hereunto set my hand.

FRANK S. CHURCH.

Witnesses:
R. E. DOLLEY,
SOL. RAUSSEAU.